United States Patent
Tang

(10) Patent No.: US 6,902,293 B2
(45) Date of Patent: Jun. 7, 2005

(54) BATTERY-OPERATED LIGHTING DEVICE

(75) Inventor: Yun Keung Stanley Tang, New Territories (HK)

(73) Assignee: Techtronic Industrial Co., Ltd., New Territories (HK)

( * ) Notice: Subject to any disclaimer, the term of this patent is extended or adjusted under 35 U.S.C. 154(b) by 165 days.

(21) Appl. No.: 09/988,247

(22) Filed: Nov. 19, 2001

(65) Prior Publication Data

US 2003/0095403 A1 May 22, 2003

(51) Int. Cl.[7] .................................................. F21L 4/00
(52) U.S. Cl. ........................ 362/183; 362/203; 315/297; 320/110; 320/115
(58) Field of Search ................................ 320/107, 110, 320/112, 113, 114, 115, 140; 362/183, 190, 191, 199, 203, 204, 287, 198; 315/291, 293, 294, 297, 301 B, 307, 308

(56) References Cited

U.S. PATENT DOCUMENTS

| | | | | |
|---|---|---|---|---|
| 4,345,304 A | * | 8/1982 | Penney et al. ............... | 362/183 |
| 5,010,454 A | * | 4/1991 | Hopper ......................... | 362/61 |
| 5,791,763 A | * | 8/1998 | Kam-Hoi ..................... | 362/183 |
| 5,859,506 A | * | 1/1999 | Lemke ........................ | 315/308 |
| 5,908,233 A | * | 6/1999 | Heskett et al. .............. | 362/183 |
| 5,945,806 A | * | 8/1999 | Faulk .......................... | 320/127 |
| 5,988,828 A | * | 11/1999 | Prince et al. ................ | 362/191 |

* cited by examiner

*Primary Examiner*—John Anthony Ward
(74) *Attorney, Agent, or Firm*—Leydig, Voit & Mayer, Ltd.

(57) ABSTRACT

A battery-operated lighting device for use with any one of several rechargeable battery packs, each battery pack having a pair of terminals and a different operating voltage. The lighting device includes a casing having first and second parts, a lighting unit including a light bulb located at the first casing part, and a battery chamber at the second casing part for receiving at least part of and locating the battery packs. The light bulb has an operating voltage. A pair of electrical contacts is located in the chamber for making electrical connection with respective terminals of a battery pack located by the chamber. The casing houses an electronic voltage regulating circuit that has an input and an output in electrical connection with the contacts and the light bulb, respectively. The circuit regulates the voltage of the battery pack to substantially the operating voltage of the light bulb for operating the light bulb.

12 Claims, 2 Drawing Sheets

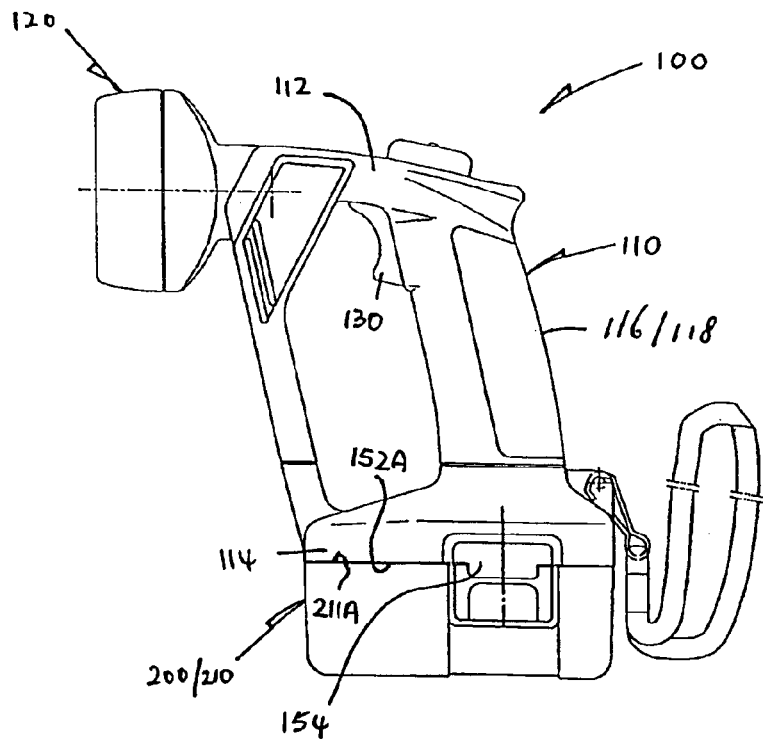
FIG. 1
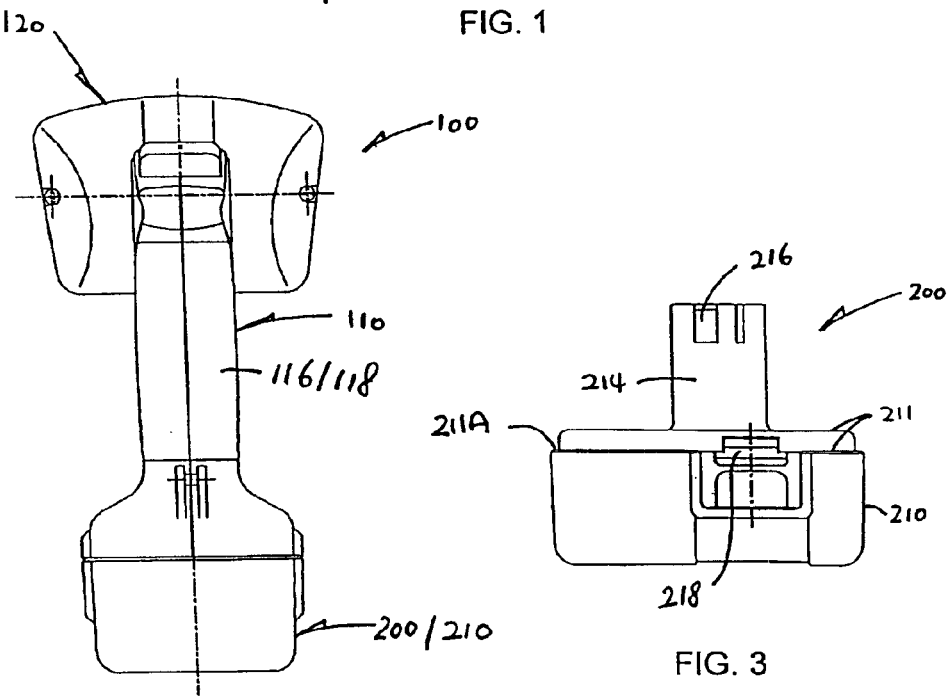
FIG. 2
FIG. 3

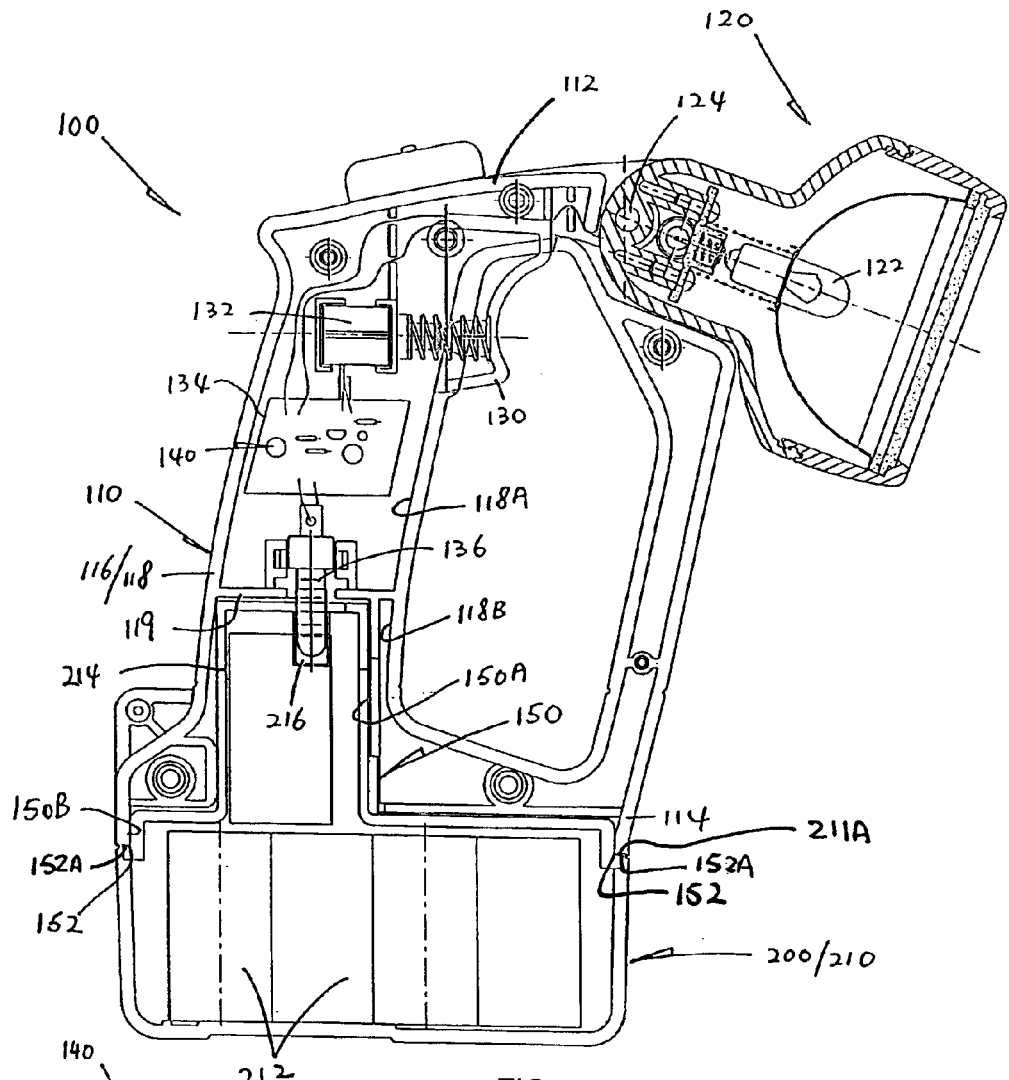

BATTERY-OPERATED LIGHTING DEVICE

The present invention relates to a lighting device that operates on a rechargeable battery pack.

BACKGROUND OF THE INVENTION

An electrical appliance that operates on a rechargeable battery pack requires the use of a battery pack of a specified design and a specified operating voltage. Examples of such electrical appliances are power hand tools, such as drills, and lighting devices, such as torch lights. For promotion, electric hand drills are sometimes sold with a torch light as a gift, in which case the torch light is designed to operate on the same battery pack as the drill.

In the same series or design, electric hand drills are available in different driving powers, which determine the operating voltage of the battery pack needed. It is therefore necessary to produce torch lights of different operating voltages to go with electric hand drills of the same operating voltage. This complicates the manufacturing, inventory control, and packaging of such products.

The invention seeks to mitigate or at least alleviate such a problem by providing an improved battery-operated lighting device.

SUMMARY OF THE INVENTION

According to the invention, there is provided a battery-operated lighting device for use with any one of a plurality of rechargeable battery packs, each pack having a pair of terminals and a different operating voltage. The lighting device comprises a casing having first and second parts, a lighting unit including a light bulb provided at the first casing part, and a battery chamber formed at the second casing part for receiving at least part of and locating said any one battery pack. The light bulb has an optimum operating voltage. A pair of electrical contacts is located in the chamber for making electrical connection with respective terminals of said battery pack located by the chamber. The casing houses an electronic voltage regulating circuit that has an input and an output in electrical connection with the contacts and the light bulb respectively. The circuit is arranged to regulate the voltage of said battery pack down to substantially the optimum operating voltage of the light bulb for operating the light bulb.

Preferably, the chamber has an opening through which said part of the battery pack is insertable into the chamber. The opening has a periphery of a shape and size substantially the same as that of an adjacent periphery of said part of the battery pack for matching therewith when said battery pack is located by the chamber.

More preferably, the outer surface of the casing forming the chamber is arranged to lie substantially flush with that of said battery pack when said battery pack is located by the chamber.

In a specific construction, the casing has a lower end that forms the chamber, said chamber having a bottom opening through which said part of the battery pack is insertable into the chamber, with the rest of said battery pack acting as a weighted base for the overall torch light.

More specifically, the casing has an upper end that supports the lighting unit and includes a middle section between the upper and lower ends that is shaped to form an upright handgrip.

In a preferred embodiment, the voltage regulating circuit is implemented based on an integrated circuit chip to provide a substantially constant output voltage that is the optimum operating voltage of the light bulb, irrespective of an input voltage falling within a predetermined range.

More preferably, the voltage regulating circuit includes a feedback loop connected from the output back to the integrated circuit chip, which loop is arranged to provide a signal indicative of the level of the output voltage to enable the chip to maintain the output voltage at a substantially constant level.

It is preferred that the predetermined range of input voltage is substantially from 9.6V to 18.0V DC.

More preferably, the operating voltages of said battery packs are substantially 9.6V, 12.0V, 13.2V, 14.4V, 15.6V, 16.8V and 18.0V.

It is preferred that the optimum operating voltage of the light bulb is substantially 9.3V DC.

BRIEF DESCRIPTION OF DRAWINGS

The invention will now be more particularly described, by way of example only, with reference to the accompanying drawings, in which:

FIG. 1 is a left side view of an embodiment of a battery-operated lighting device in accordance with the invention, with a battery pack connected thereto;

FIG. 2 is a rear view of the lighting device and battery pack of FIG. 1;

FIG. 3 is a left side view of the battery pack of FIG. 1;

FIG. 4 is a cross-sectional right side view of the lighting device and battery pack of FIG. 1; and FIG. 5 is a circuit diagram of an operating circuit of the lighting device of FIG. 1.

DETAILED DESCRIPTION OF PREFERRED EMBODIMENT

Referring initially to FIGS. 1 to 4 of the drawings, there is shown a battery-operated lighting device in the form of a torch light 100 embodying the invention, which light 100 comprises a plastics casing 110 having upper and lower ends 112 and 114, a lighting unit 120 provided at the upper casing end 112, and a battery chamber 150 formed at the lower casing end 114. The casing 110 includes a middle section 116 that is shaped to form an upright handgrip 118, at the upper end of which a spring-loaded trigger 130 is located to control the lighting unit 120.

The lighting unit 120 incorporates a light bulb 122 and is pivotably connected to the upper end 112 of the casing 110 by means of a hinge 124, such that it may be turned up and down relative to the casing 110 to point at different angles. The light bulb 122 has an optimum operating voltage of about 9.3V DC.

The handgrip 118 is hollow and is divided by a horizontal partition 119 into upper and lower parts 118A and 118B. The upper part 118A houses a press switch 132 which is coupled to the trigger 130 for actuation thereby to switch the light bulb 122 on and off. Also housed in the this casing part 118A are a printed circuit board 134 mounting an electronic voltage regulating circuit 140, and a pair of electrical contact strips 136. The contact strips 136 are located to pass through the partition 119 into the top end of the lower casing part 118B, on opposite left and right sides thereof and opposing each other. The lower part 118B expands in cross-section downwardly to form the battery chamber 150.

The battery chamber 150 has a bottom opening 152 having a substantially rectangular periphery in the form of a rim 152A. Internally, the chamber 150 consists of a relatively tall and narrow inner (upper) part 150A and a relatively shallow and wide outer (lower) part 150B, said outer part 150B defining the bottom opening 152. The bottom opening 152 includes, on its left and right sides, a pair of opposed hooks 154.

The torch light 100 works on a rechargeable battery pack 200 that is originally designed for powering an electrical power hand tool such as a hand drill. The battery pack 200 has a cuboidal body 210 which includes an upper surface 211 having a generally rectangular periphery 211A and houses a bank of battery cells 212. The battery body 210 includes a stem 214 projecting upwards from the upper surface 211, at the uppermost end and on opposite left and right sides of which a pair of battery terminals 216 is located. The battery body 210 further includes, on opposite left and right sides thereof, a pair of spring-loaded catches 218.

The battery pack 200 is to be inserted upwards into the chamber 150 of the torch light 100, for locating thereby. In doing so, the battery stem 214 extends fully into the inner chamber part 150A, with the upper surface 211 being received within the outer chamber part 150B and closing the bottom opening 152 of the chamber 150. As soon as the battery pack 200 is parked against the lower casing end 114, the catches 218 of the former snap with respective hooks 154 of the latter, whereby the battery pack 200 is locked connected.

The upper periphery 211A of the battery body 210 has substantially the same shape and size as the rim 152A of the bottom opening 152, such that the battery pack 200, or more precisely its body 210, forms a matching, weighted base of the overall torch light 100 for the torch to stand on. In particular, the outer surfaces of the torch casing 110 and battery body 210 across their junction lie substantially flush with each other. Depression of both catches 218 allows detachment of the battery pack 200.

The battery pack 200 can be any one available from a line or series of battery packs having different predetermined operating voltages that fall within the range from 9.6V to 18.0V DC and are typically 9.6V, 12.0V, 13.2V, 14.4V, 15.6V, 16.8V and 18.0V. Apart from the difference in operating voltage, all battery packs 200 of the same line have substantially the same physical shape and size, at least insofar as their stems 214 (for internal connection) and the upper peripheries 211A of their bodies 210 (for external matching) are concerned, such that any one of the battery packs 200 can fit the torch light 100. The battery packs 200 are originally designed to drive respective electric hand drills belonging to the same line of products, according to their operating voltages.

Reference is now made to FIG. 5. In order to cater for the variation in the operating voltage of the battery packs 200, the voltage regulating circuit 140 is designed to provide a constant output voltage, irrespective of the value of the input voltage applied by any one of the battery packs 200 in use that falls within a predetermined range. The constant output voltage is the optimum operating voltage of the light bulb 122, i.e. 9.3V DC. The predetermined input voltage range covers the operating voltages of all compatible battery packs 200, i.e. from 9.6V to 18.0V DC.

The voltage regulating circuit 140 has a pair of positive and negative input terminals 141 and 142 which are connected to the contact strips 136 respectively for subsequent connection to the respective terminals 216 of the battery pack 200. The circuit 140 includes a pair of positive and negative output terminals 143 and 144 which are connected to the light bulb 122.

The circuit 140 is implemented based on an integrated circuit chip IC1 that is connected at its VIN and VOUT pins in series across the positive terminals 141 and 143. The VIN pin is connected to the positive input terminal 141 via the switch 132 for manual control, behind which a capacitor C1 is connected across the input terminals 141 and 142. The VOUT pin is connected to the positive output terminal 143 via an inductor L1 for smoothing the output current, behind which a capacitor C2 is connected across the output terminals 143 and 144. The negative terminals 142 and 144 are connected together as the ground.

The chip IC1 includes a GND pin connected direct to the ground, and an ON/OFF pin that is connected to the ground via a capacitor C3. The capacitor C3 serves to slow down the rise of the output current at the VOUT pin such that the light bulb 122 will have a soft start over the initial few seconds. A pair of resistors R2 and R3 is connected in series across the output terminals 143 and 144, having a common node to which an OADJ pin of the chip IC1 is connected. The circuit 140 includes a diode D1 that is connected at its anode to the ground and at its cathode to the VOUT pin.

In operation, the chip IC1 converts a DC input voltage, in the range from 9.6V to 18.0V, applied at the VIN pin into voltage pulses appearing at the VOUT pin. The pulsating output voltage is then smoothed by the inductor L1 and the capacitor C2, whose mean level (value) is fed by means of the resistors R1 and R2 back to the chip IC1 at its OADJ pin. The resistors R1 and R2 and their connection to the chip IC1 constitutes a feedback loop connected from the output terminals 143 and 144 back to the chip IC1. The feedback loop serves to provide a signal indicative of the actual level of the output voltage to enable the chip IC1 to maintain the output voltage at the desired level.

More specifically, the chip IC1 will adjust the mark-to-space (or on-to-off) ratio of the voltage pulses in order to provide a substantially constant, regulated DC output voltage across the output terminals 143 and 144, i.e. 9.3V, for operating the light bulb 122. During the off states, i.e. intervals between adjacent voltage pulses, the diode D1 and inductor L1 serve to maintain at least a small output current to ensure that the light bulb 122 has a smooth operation and is not subject to inrush current, such that the bulb 122 will have a better reliability or longer operating life.

With the use of the voltage regulating circuit 140, the torch light 100 is capable of working on any one of the battery packs 200 which have the same body design but different operating voltages. The battery packs 200 may be originally made for driving respective electrical power hand tools of the same product line. Insofar as the torch light 100 is concerned, it can be operated universally by any compatible battery pack 200 whose operating voltage can differ (within a certain range).

As being compatible with more than one battery pack or battery voltage, the torch light of the subject invention is convenient to use. For this reason, the torch light can be sold with any one of electrical power hand tools whose driving powers are different, to share the same battery pack.

The invention has been given by way of example only, and various modifications of and/or alterations to the described embodiment may be made by persons skilled in the art without departing from the scope of the invention as specified in the appended claims.

What is claimed is:

1. A battery-operated lighting device for use with any one of a plurality of rechargeable battery packs, each battery pack having a pair of terminals and producing a respective, different battery voltage, said battery-operated lighting device comprising:
- a casing having first and second casing parts,
- a lighting unit including a light bulb located in said first casing part, said light bulb having a fixed operating voltage,
- a battery chamber having
  - an internal part located within said second casing part and receiving a first portion of any of the battery packs, and
  - an external part including an end-forming part having an opening extending into the internal part of said battery chamber, the end-forming part engaging a second portion of a battery pack of which the first portion is inserted into the internal part of said battery chamber, with the second portion of the battery pack protruding from the end-forming part of said battery chamber and from said casing as a weighted base for said battery-operated lighting device,
- a pair of electrical contacts located in the internal part of said battery chamber for making electrical connection with respective terminals of whichever of the battery packs is located in said battery chamber, and
- an electronic voltage regulating circuit within said casing and having an input and an output electrically connected to said electrical contacts and to said light bulb, respectively, said voltage regulating circuit regulating whatever battery voltage is supplied by whichever of the battery packs is located in said battery chamber and connected to said input of said voltage regulating circuit to substantially the fixed operating voltage of said light bulb at said output of said voltage regulating circuit, for operating said light bulb.

2. The battery-operated lighting device as claimed in claim 1, wherein the external part of said battery chamber has a rim having a periphery with a shape and size substantially the same as the second portion of any of the battery packs, for locating any of the battery packs in said battery chamber.

3. The battery-operated lighting device as claimed in claim 2, wherein said second casing part has an outer surface lying substantially flush with the second portion of any of the battery packs located in said battery chamber.

4. The battery-operated lighting device as claimed in claim 1, wherein said casing has a third casing part, intermediate the first and second casing parts, that includes a handgrip.

5. The battery-operated lighting device as claimed in claim 1, wherein the fixed operating voltage of said light bulb is substantially 9.3 volts.

6. A battery-operated lighting device for use with any one of a plurality of rechargeable battery packs, each battery pack having a pair of terminals and producing a respective, different battery voltage, said battery-operated lighting device comprising:
- a casing having first and second casing parts,
- a lighting unit including a light bulb located at said first casing part, said light bulb having a fixed operating voltage,
- a battery chamber located at said second casing part for receiving at least part of and locating any of the battery packs, wherein the operating voltages of the battery packs are substantially 9.6V, 12.0V, 13.2V, 14.4V, 15.6V, 16.8V, and 18.0V,
- a pair of electrical contacts located in said battery chamber for regulating electrical connection with respective terminals of whichever of the battery packs is located in said battery chamber, and
- an electronic voltage regulating circuit within said casing and having an input and an output electrically connected to said electrical contacts and to said light bulb, respectively, said voltage regulating circuit regulating whatever battery voltage is supplied by whichever of the battery packs is in said battery chamber and connected to said input of said voltage regulating circuit to substantially the fixed operating voltage of said light bulb at said output of said voltage regulating circuit, for operating said light bulb, wherein said voltage regulating circuit includes
  - an integrated circuit chip producing a substantially constant output voltage that is the fixed operating voltage of said light bulb, irrespective of an input voltage supplied by whichever of the battery packs is in said battery chamber, and
  - a feedback loop connected from said output to said integrated circuit chip for indicating output voltage of said voltage regulating circuit.

7. The battery-operated lighting device as claimed in claim 6, wherein said casing has a lower end farming part of said battery chamber, said battery chamber having a bottom opening through which a part of any of the battery packs is insertable into said battery chamber, a battery pack in and protruding from said battery chamber acting as a weighted base for said battery-operated lighting device.

8. The battery-operated lighting device as claimed in claim 7, wherein said casing has an upper end that supports said lighting unit and a middle section including a handgrip.

9. The battery-operated lighting device as claimed in claim 6, wherein the fixed operating voltage of said light bulb is substantially 9.3V DC.

10. A battery-operated lighting device for use with any one of a plurality of rechargeable battery packs, each battery pack having a pair of terminals and producing a respective, different battery voltage, said battery-operated lighting device comprising:
- a casing having first and second casing parts,
- a lighting unit including a light bulb located at said first casing part, said light bulb having a fixed operating voltage,
- a battery chamber located at said second casing part for receiving at least part of and locating any of the battery packs,
- a pair of electrical contacts located in said battery chamber for making electrical connection with respective terminals of whichever of the battery packs is located in said battery chamber, and
- an electronic voltage regulating circuit within said casing and having an input and an output electrically connected to said electrical contacts and to said light bulb, respectively, said voltage regulating circuit regulating input voltages connected to said input of said voltage regulating circuit, in a range from 9.6 volts to 18 volts, to substantially the fixed operating voltage of said light bulb at said output of said voltage regulating circuit, for operating said light bulb.

11. The battery-operated lighting device as claimed in claim 10, wherein the fixed operating voltage of said light bulb is less than 9.6 volts.

12. The battery-operated lighting device as claimed in claim 11, wherein the fixed operating voltage of said light bulb is substantially 9.3 volts.

* * * * *